United States Patent
Lindemann et al.

(10) Patent No.: US 10,511,232 B2
(45) Date of Patent: Dec. 17, 2019

(54) ADAPTIVE CONTROL OF SYNCHRONOUS RECTIFIER

(71) Applicant: PR electronics A/S, Rønde (DK)

(72) Inventors: Stig Lindemann, Højbjerg (DK); Janus Honoré, Hovedgård (DK)

(73) Assignee: PR ELECTRONICS A/S, Rønde (DK)

( * ) Notice: Subject to any disclaimer, the term of this patent is extended or adjusted under 35 U.S.C. 154(b) by 0 days.

(21) Appl. No.: 16/153,053

(22) Filed: Oct. 5, 2018

(65) Prior Publication Data

US 2019/0140549 A1    May 9, 2019

(30) Foreign Application Priority Data

Oct. 6, 2017   (DK) .................................. 2017 70763

(51) Int. Cl.
| | |
|---|---|
| H02M 3/335 | (2006.01) |
| H02M 1/00 | (2006.01) |
| H02M 3/07 | (2006.01) |
| H02M 1/08 | (2006.01) |

(52) U.S. Cl.
CPC ......... *H02M 3/33592* (2013.01); *H02M 1/08* (2013.01); *H02M 3/07* (2013.01)

(58) Field of Classification Search
CPC ......... H02M 3/33553; H02M 3/33592; H02M 3/33569; H02M 3/33576; H02M 2001/0048; H02M 2001/0009; H02M 3/073; H02M 3/07; H02M 1/08
See application file for complete search history.

(56) References Cited

U.S. PATENT DOCUMENTS

| | | | | |
|---|---|---|---|---|
| 6,021,059 A | * | 2/2000 | Kennedy | H02M 3/33592 363/127 |
| 6,026,005 A | * | 2/2000 | Abdoulin | H02M 3/33592 363/127 |
| 6,348,755 B1 | * | 2/2002 | Shimamura | H01L 41/044 310/318 |
| 8,154,888 B2 | | 4/2012 | Yang | |
| 9,312,777 B2 | * | 4/2016 | Lefedjiev | H02M 3/33523 |
| 9,577,542 B2 | * | 2/2017 | Lin | H02M 3/33592 |
| 9,660,544 B1 | | 5/2017 | Telefus | |

(Continued)

FOREIGN PATENT DOCUMENTS

| | | |
|---|---|---|
| EP | 0884829 A1 | 12/1998 |
| EP | 1722466 A1 | 11/2006 |

OTHER PUBLICATIONS

Brian Acker, "Synchronous Rectification with Adaptive Timing Control", Power Electronics Specialists Conference, Jun. 1995, vol. 1., p. 88-95, XP055561329.

(Continued)

*Primary Examiner* — Adolf D Berhane
*Assistant Examiner* — Sisay G Tiku
(74) *Attorney, Agent, or Firm* — Cantor Colburn LLP

(57) ABSTRACT

The present invention relates to a current loop powered DC-DC switch mode converter for use as a local isolated low power supply for electronic circuits such as current loop transmitters where the requirements for supply efficiency and cost of the implementation is critical. It is the object of the invention to provide a simple and low cost solution for driving a synchronous rectifier thereby improving the supply efficiency, especially at low output voltages.

19 Claims, 6 Drawing Sheets

(56) References Cited

U.S. PATENT DOCUMENTS

| | | | |
|---|---|---|---|
| 2010/0027298 A1* | 2/2010 | Cohen | H02M 3/33592 363/21.14 |
| 2010/0182806 A1* | 7/2010 | Garrity | H02M 3/33569 363/21.14 |
| 2013/0058135 A1* | 3/2013 | Marino | H02M 3/33507 363/21.02 |
| 2014/0211517 A1* | 7/2014 | Gong | H02M 3/33592 363/21.14 |
| 2016/0294298 A1 | 10/2016 | Wong | |
| 2017/0063246 A1 | 3/2017 | Kong | |
| 2018/0090993 A1* | 3/2018 | Markhi | H02M 3/33592 |
| 2018/0097513 A1* | 4/2018 | Couleur | H03K 7/06 |
| 2018/0219399 A1* | 8/2018 | Balakrishnan | H01R 24/64 |

OTHER PUBLICATIONS

European Search Report for corresponding application EP18198897; Report dated Mar. 8, 2019.

* cited by examiner

ADAPTIVE CONTROL OF SYNCHRONOUS RECTIFIER

CROSS REFERENCE TO RELATED APPLICATION

This application is related to and claims the benefit of Danish Patent Application Number PA 2017 70763 filed on Oct. 6, 2017, the entire contents of which are herein incorporated by reference.

FIELD OF THE INVENTION

The present patent application discloses an isolated current loop powered DC-DC converter comprising a switch transformer and at least one active rectifier controlled by an adaptive control scheme, comprising a phase detector driving a charge pump and a loop filter, which charge pump and loop filter generates a control signal to control the pulse length driving the switch element used in the active rectifier.

BACKGROUND OF THE INVENTION

Most modern low power electronic circuits operate at low supply voltages (1.6V-3.6V). Generation of the local low voltage supply is often an obvious application for a transformer-based switch mode DC-DC converter, since the voltage might be generated from an available energy source of other voltage level (for example an energy source voltage between 5 V and 300 V DC) or system requirements dictates that the supply must be galvanic isolated from the source of energy.

In low power systems, e.g. battery operated systems or current loop powered systems, the efficiency of the DC-DC converter can have a significant impact on the total system power consumption, leading to a requirement for a high efficiency converter.

In low voltage applications, the voltage drop and associated power loss of an output rectifier diode results in a significant degradation of the converter efficiency. One well established solution for reducing the power lost in the rectifier is to employ an active rectifier usually comprised of a FET transistor, but in most prior art this will require expensive electronic components or complex signalling schemes, e.g. integrated circuits or additional transformer windings, used to drive the FET rectifier.

Autonomous synchronous rectifiers have been disclosed in EP 0884829 "Single ended forward converter with synchronous rectification and delay circuit in phase-locked loop", U.S. Pat. No. 9,660,544 "Self-Driven synchronous rectifier circuit", US20170063246 "Adaptive synchronous rectifier control", and US20140211517 "Switching converter and AC adapter using the same".

EP 0884829 discloses a synchronous rectification based on a complex dual structure phase-lock loops and voltage controlled oscillators to employ the synchronous rectifier functionality.

U.S. Pat. No. 9,660,544 discloses a relatively simple circuit to employ the synchronous rectifier functionality based on a current detection functionality (22) at FIGS. 5 and 6.

US20170063246 discloses a synchronous rectifier where the detection of switching state is based on current sensing by a voltage sense across the switching element S2 in FIG. 2 causing a continuous power dissipation in switch S2 and thereby a reduced efficiency of the DCDC converter.

US20140211517 discloses a switching converter circuitry including a synchronous rectifier based on a delay locked loop, comprising a rising edge detector, a phase detector, a delay compensator and a voltage controlled oscillator (VCO). The switching converter being applicable for AC-adapters to be used in conjunction with PC's.

SUMMARY OF THE INVENTION

It is an object of the present patent application to achieve a control scheme for the synchronous rectifier in an isolated forward DC-DC converter powered by a current loop, such that said DC-DC converter is suitable for operating at low voltage and low power while maintaining high efficiency, for example as a current loop transmitter such as a temperature transmitter. A further object is that the control scheme must be able to operate reliable under varying operating conditions. A further object is to achieve an implementation of said DC-DC converter that can be realized at low cost using readily available standard electronic components.

The present invention relates to a current loop powered power converter, for example in a current loop transmitter such as a temperature transmitter, comprising a switching transformer having a primary and a secondary winding, the primary winding being connected to a drive circuitry and the secondary winding being connected to at least one active rectifier and an output capacitance across which the output voltage appears. The active rectifier in the circuit is comprised of a field-effect transistor, FET transistor, and an adaptive control circuit driving the FET transistor.

The present invention differs from prior art by employing a simple regulation loop, which ensures the timing of synchronous rectifier is in accordance with the switching of driver transistor on the primary side of the transformer without having any signalling across the isolation barrier. The regulation loop adjusts the switch off time of the synchronous rectifier in a novel way, whereas the switch on of the synchronous rectifier is triggered by the signal present at the secondary side of the transformer.

Current loop transmitters and especially temperature transmitters are heavily sensitive to power loss and thereby requirement of high efficiency of voltage conversion, as the natural limit of current (minimum 3.5 mA to maximum 23 mA) and the voltage limit requirements (typical 5-10 V) coming from use in explosive atmospheres (EX/ATEX) causes a very limiting power budget for the transmitters.

In an aspect of the present invention, a current loop powered DC-DC converter is provided, comprising a transformer having a primary winding and a secondary winding establishing a primary side and a secondary side, the primary winding being connected to a transformer drive circuitry imposing a drive signal onto the primary winding, the secondary winding being connected to at least one rectifier, characterized in that the rectifier is realized as an active rectifier, comprising a FET-transistor and a rectifier drive circuitry arranged to provide a gate drive signal for the FET-transistor, which rectifier drive circuitry comprises a phase detector arranged to detect a phase difference between a representation of a pulse of a transformer transferred driver signal present at the secondary side of the transformer and a representation of a pulse of the gate drive signal for the active rectifier FET transistor, an output signal of the phase detector being connected to a charge balance circuitry arranged to control by a charge balance circuitry output voltage a pulse length of the active rectifier FET transistor gate drive signal, which charge balance circuitry comprises a charge pump and a low pass filter.

The object of the invention is to obtain a drive signal to the FET transistor gate synchronized with the signal present on the switching transformer secondary winding in such a way that the FET is in a low impedance state when the rectifier is conducting current in the forward direction and in a high impedance state otherwise, thereby minimizing the power loss in the rectifier and improving the efficiency within the above-mentioned very limited power budget for current loop transmitters, such as temperature transmitters.

A highly advantageous feature of the present invention is the focus on controlling the pulse lengths of the gate drive signal for the active rectifier FET. The pulse length of the gate drive signal can be regulated for each switching period, i.e. for each pulse. In an advantageous embodiment, the pulse start is determined by one signal, preferably the representation of the transformer transferred driver signal, and the pulse length, and thereby the pulse end, is determined by the result of the phase comparison. Hence, gate drive pulse start and gate drive pulse length may be individually determined. Instead of edge detection, the present invention in an advantageous embodiment compares phases of a representation of the transformer transferred driver signal and a representation of the FET gate drive signal, and uses the amount of phase difference to regulate the FET gate drive signal. Instead of providing a narrow pulse gate off signal, the present invention in an advantageous embodiment simply turns the FET gate on when the gate drive pulse starts, and off when the gate drive pulse comes to its length-regulated end.

In other words, in the present invention the gate drive to the rectifier FET is synchronized to the signal on the transformer secondary side signal by means of a phase detector/charge pump and a voltage controlled variable pulse length circuitry. The phase detector compares the pulse length of the signal on the transformer secondary side to the length of the gate drive signal to the rectifier FET and the charge pump adjusts the drive signal to the variable pulse length circuitry accordingly.

Using this control scheme it is not necessary to transmit the transformer drive signal across the isolation barrier using a separate transmission path (e.g. additional transformer windings or optocoupler), since the gate driving circuitry adapts the gate drive pulse length to the pulse length of the signal on the transformer secondary winding.

The proposed control scheme is simple and can be implemented using low cost commercial of the shelf components.

In an advantageous embodiment, the representation of a pulse of the gate drive signal comprises a pulse-stretched representation of the pulse, for example established by the active rectifier drive circuitry comprising a pulse stretch circuitry arranged to establish the representation of a pulse of the gate drive signal and provide it to the phase detector.

The proposed control scheme may in various embodiments advantageously solve the problem of reaching a synchronized state from any asynchrony between primary side switching circuit and secondary side rectifier, whether the asynchrony is related to the gate drive signal pulses being shorter or longer than the transformer drive pulses, or even so much longer that they extend significantly into the demagnetizing phase of the transformer cycle. This is achieved by the voltage controlled pulse lengths together with the feedback of stretched pulses of the gate drive signal.

A particularly advantageous part of the circuit is the pulse stretch circuitry, which ensures regulation of the pulse length to both longer and shorter pulse length. The size of the pulse stretch is non-critical, but may be designed as a trade off:

Long pulse stretch will cause increased loss as during the pulse stretch period only the diode D1 will be conducting the current on the secondary side of the transformer A too short pulse stretch can cause instability in the regulation mechanism if the timing jitter noise within the circuitry is comparable to or larger than pulse stretch time. It shall be noted that the timing jitter noise will be reduced by the loop filter and thereby a narrow bandwidth loop filter can enable a small pulse stretch.

The pulse stretch will typical be in the range of 1-10% of the period of the switching frequency.

In an advantageous embodiment, the representation of the pulse of the transformer transferred driver signal is established by buffering, e.g. by an inverting Schmitt trigger, the transformer transferred driver signal.

In an advantageous embodiment, the phase difference detected by the phase detector relates to a difference in pulse length or in transition timing or in trailing edge timing of the representation of the pulse of the transformer transferred driver signal and the representation of a pulse of the gate drive signal.

In an advantageous embodiment, the transformer transferred driver signal is present between the secondary winding and the active rectifier, for example at a lower terminal of the secondary winding of the transformer. In an advantageous embodiment, the rectifier drive circuit is arranged to turn on the active rectifier FET transistor initiated by a signal transition from high to low of the transformer transferred driver signal.

In an advantageous embodiment, said gate drive signal gets synchronized to said transformer transferred driver signal.

In an advantageous embodiment, said DC-DC converter is a switching DC-DC converter having a switching circuitry at a primary side. In an advantageous embodiment, said drive signal imposed by said transformer drive circuitry onto the primary winding is a switching voltage. In an advantageous embodiment, whereby rectifying on the secondary side is synchronized with switching on the primary side.

In an advantageous embodiment, said secondary side is galvanically isolated from said primary side, and highly advantageously the rectifier drive circuit may also be galvanically isolated from said transformer drive circuit.

In an advantageous embodiment, a DC secondary voltage is less than 6 V, for example less than or approximately 2 V.

By the present invention may be achieved highly efficient power supply for even very low voltage loads, such as e.g. loads requiring 3.6V, but even as little as for example 2V or 1.6V can be efficiently provided for. This is highly advantageous for current loop transmitters, such as temperature transmitters.

In an advantageous embodiment, the phase detector comprises an analog switch for controlling said output signal of the phase detector. This embodiment may advantageously be configured so that either the representation of a pulse of the gate drive signal or the representation of a pulse of the transformer transferred driver signal is arranged to control said analog switch, and the other is arranged to control a current flowing into said analog switch and on to said charge balance circuitry.

Thereby is facilitated advantageous, simple and power-efficient ways to charge the charge pump in accordance with a phase difference between the representations of the gate drive signal and the transformer transferred driver signal.

In an advantageous embodiment, the phase detector and charge pump circuitry comprises a first transistor, which first transistor is by a source terminal connected to a supply voltage, and a second transistor, which second transistor is by a source terminal connected to a ground reference, and both the first and the second transistors are by a gate terminal connected to the representation of a pulse of a transformer transferred driver signal, and both transistors are by a drain terminal connected to two separate input terminals on a switch, e.g. an SPDT analog switch, which switch is connected by a common terminal to the charge pump output and connected by the switch control input to the representation of a pulse of the gate drive signal. In an alternative embodiment, the phase detector and charge pump circuitry comprises a first diode, which first diode is by an anode terminal connected to the representation of a pulse of a transformer transferred driver signal, and by a cathode terminal connected to one input terminal on a switch, e.g. an SPDT analog switch, and a second diode, which second diode is by a cathode terminal connected to the representation of a pulse of a transformer transferred driver signal, and by an anode terminal connected to another input terminal on the switch, which switch is connected by a common terminal to the charge pump output and connected by the switch control input to the representation of a pulse of the gate drive signal.

In an aspect of the invention is provided a method of controlling a DC-DC converter, the DC-DC converter comprising a transformer having a primary winding and a secondary winding establishing a primary side and a secondary side, the secondary side comprising an active rectifier comprising a FET-transistor, the method comprising the steps of imposing by a transformer drive circuitry on the primary side a drive signal onto the primary winding; generating by a rectifier drive circuitry on the secondary side a gate drive signal to control the FET-transistor; and regulating a pulse length of the active rectifier FET transistor gate drive signal by a charge balance circuitry output voltage on the basis of a phase difference between a representation of a pulse of a transformer transferred driver signal present at the secondary side of the transformer and a representation of a pulse of the gate drive signal for the active rectifier FET transistor; wherein the charge balance circuitry output voltage is controlled by a charge balance circuitry comprising a charge pump and a low pass filter.

In various advantageous embodiments of the above method, the DC-DC converter is a DC-DC converter as described in various advantageous embodiments above.

DESCRIPTION OF THE DRAWINGS

Various embodiments of the invention are described with reference to the drawings, where.

DETAILED DESCRIPTION OF THE INVENTION

In the following text the figures will be described one by one and the different parts and positions seen in the figures will be numbered with the same numbers in the different figures. Not all parts and positions indicated in a specific figure will necessarily be discussed together with that particular figure.

Figure 1:
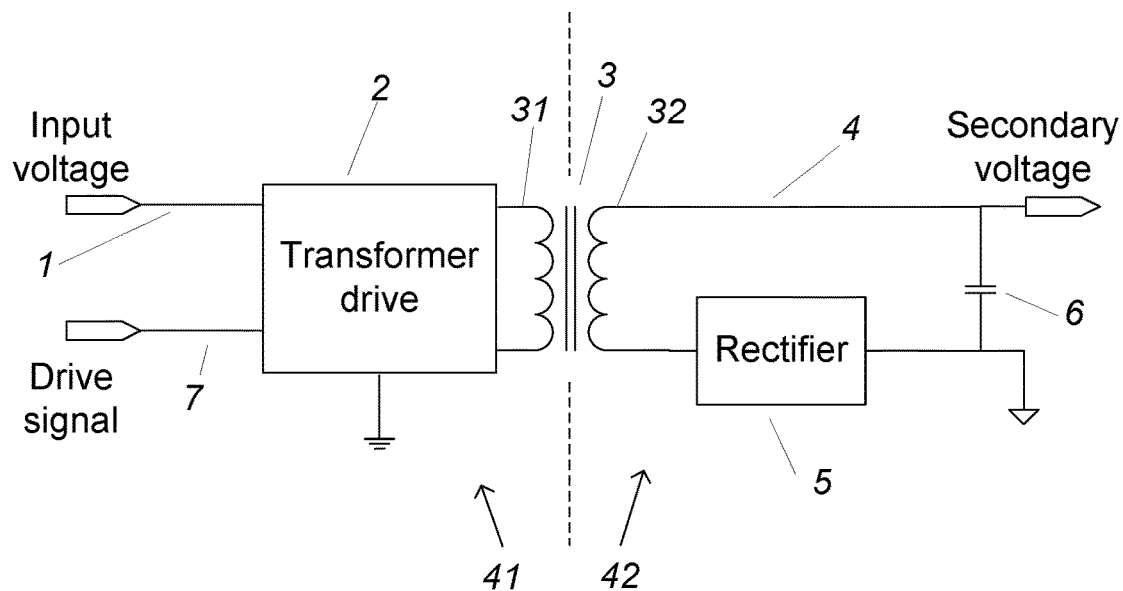
FIG. 1: Discloses a block diagram of the proposed current loop powered DC-DC converter topology.

FIG. 1 discloses a block diagram of the proposed current loop powered DC-DC converter topology, comprising a transformer (3) with a primary winding (31) and a secondary winding (32), thereby dividing the DC-DC converter into a primary side (41) and a secondary side (42), galvanically isolated from each other.

Figure 2:
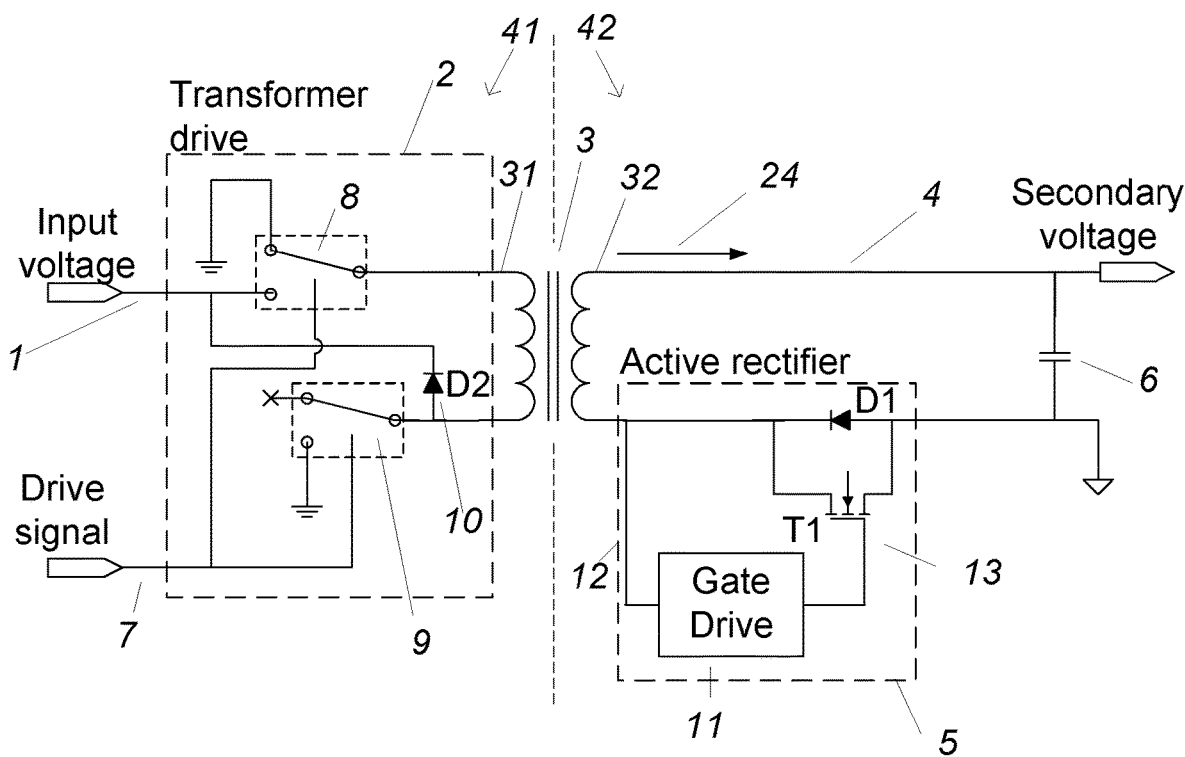
FIG. 2: Discloses one possible embodiment of the DC-DC converter topology.

FIG. 2 discloses one possible embodiment of the current loop powered DC-DC converter topology, including the field-effect transistor, FET transistor, used as switch element in the active rectifier.

The figure shows an example of a transformer drive implementation (2) comprising two single pole double throw (SPDT) switches (8 and 9) and a flyback diode (10). The transformer drive circuitry (2) is controlled by the Drive signal (7) which controls the position of the two switches (8 and 9). In a first phase (P1) of operation the switches (8 and 9) will connect the upper terminal on the transformer primary winding (31) to the Input voltage (1) from the current loop and the lower terminal to GND, thus allowing magnetizing current to flow through the primary winding. In a second phase (P2) of operation the switches (8 and 9) will change position, connecting the upper terminal on the primary winding to GND and the lower terminal to the Input voltage through the freewheeling diode (10), allowing demagnetizing current to flow in the primary winding of the transformer (3).

In a third phase (P3) of operation the position of the switches are unchanged compared to the second phase, but the transformer (3) is fully demagnetized and no current is flowing in the primary winding. The system is then ready for the next excitation pulse which will repeat operation from phase 1.

On the secondary side (42) of the transformer (3) the active rectifier (5) is connected to the lower terminal of the secondary winding (32) to obtain a transformer transferred driver signal (12). The active rectifier comprises a FET transistor (T1), a diode (D1) and a gate drive circuitry (11). The gate drive circuitry (11) is arranged to drive the FET gate signal (13) in such a way that the FET transistor (T1) is in a low impedance state when current is flowing in the forward direction of the diode (D1), and in a high impedance state otherwise, thus providing a very low forward voltage drop for the rectification. The diode (D1) is included to provide rectification during start-up of the circuitry when the secondary voltage (4) is not high enough to ensure correct operation of the gate drive circuitry (11).

Figure 3:
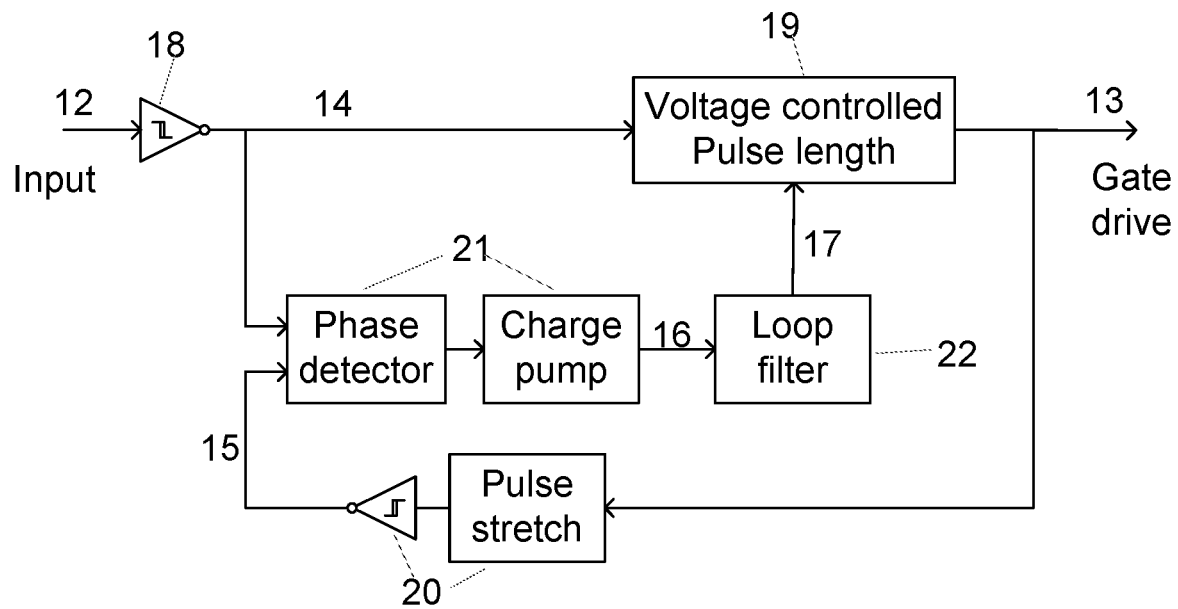
FIG. 3: Discloses a block diagram of the adaptive control circuitry for the synchronous rectifier.

FIG. 3 discloses a block diagram of the adaptive control circuitry for the synchronous rectifier according to an embodiment of the invention. The above-mentioned transformer transferred driver signal (12), derived from the secondary side (42) between the secondary winding (32) and the FET (D1), is buffered by an inverting Schmitt trigger (18) to a trigger signal (14) which is one input to a phase detector (21) and also functions as the trigger input to a voltage controlled pulse length circuitry (19). When a positive edge is present at the trigger signal (14) the Voltage controlled pulse length circuitry (19) will also output a positive edge, being the start of a pulse at the gate drive signal (13). The length of the pulse at the gate drive signal will be determined by the voltage present at a control input (17) of the voltage controlled pulse length circuitry (19).

The phase detector (21) compares the pulse length of the trigger signal (14), i.e. a representation of the transformer transferred driver signal (12) to the pulse length of the gate drive signal (13) plus a small extra length added by a pulse stretch circuitry (20). The small added length ensures that the pulse length of the gate drive signal (13) will be shorter than the pulse length of the trigger signal (14), and thus avoid conduction of the FET (T1) when current would flow from the secondary voltage (4) to ground. The small extra length added to the feedback pulses should preferably be as small as possible to approach complete synchronization, while still being sufficiently long to clearly distinguish from noise. Examples of possible values for the added extra length that may be beneficial in some embodiments, may for example be 0.1% to 10% of the total period length, e.g. for example 1% to 2% of the total period length. In an example embodiment with a switching frequency of the DC-DC converter of for example 100 kHz to 200 kHz, the added extra length may for example be between 10 ns and 1000 ns, for example between 100 ns and 200 ns. The skilled person will acknowledge that other amounts of pulse stretch may be preferable in various embodiments.

If the gate drive pulse (13) is shorter than the pulse of the transformer transferred driver signal (12), then the phase detector (21) will cause the charge pump (21) to remove charge from the loop filter (16) thus reducing the control voltage (17), which in turn will cause the voltage controlled pulse length circuitry (19) to increase the pulse length of the gate drive signal (13).

If the gate drive pulse (13) is longer than the pulse of the transformer transferred driver signal (12), then the phase detector (21) will cause the charge pump (21) to inject charge into the loop filter (16) thus increasing the control voltage (17), which in turn will cause the voltage controlled pulse length circuitry (19) to decrease the pulse length of the gate drive signal (13).

The adaptive control circuitry of the active rectifier (5) will thus regulate the length of the gate drive pulses (13) to adapt to the length of the transformer transferred driver signal pulses existing on the secondary side (42) of the transformer (3). The resulting length of the gate drive pulses will be the pulse length of the transformer transferred driver signal pulse minus the extra length added by the pulse stretch circuitry.

Figure 4A:
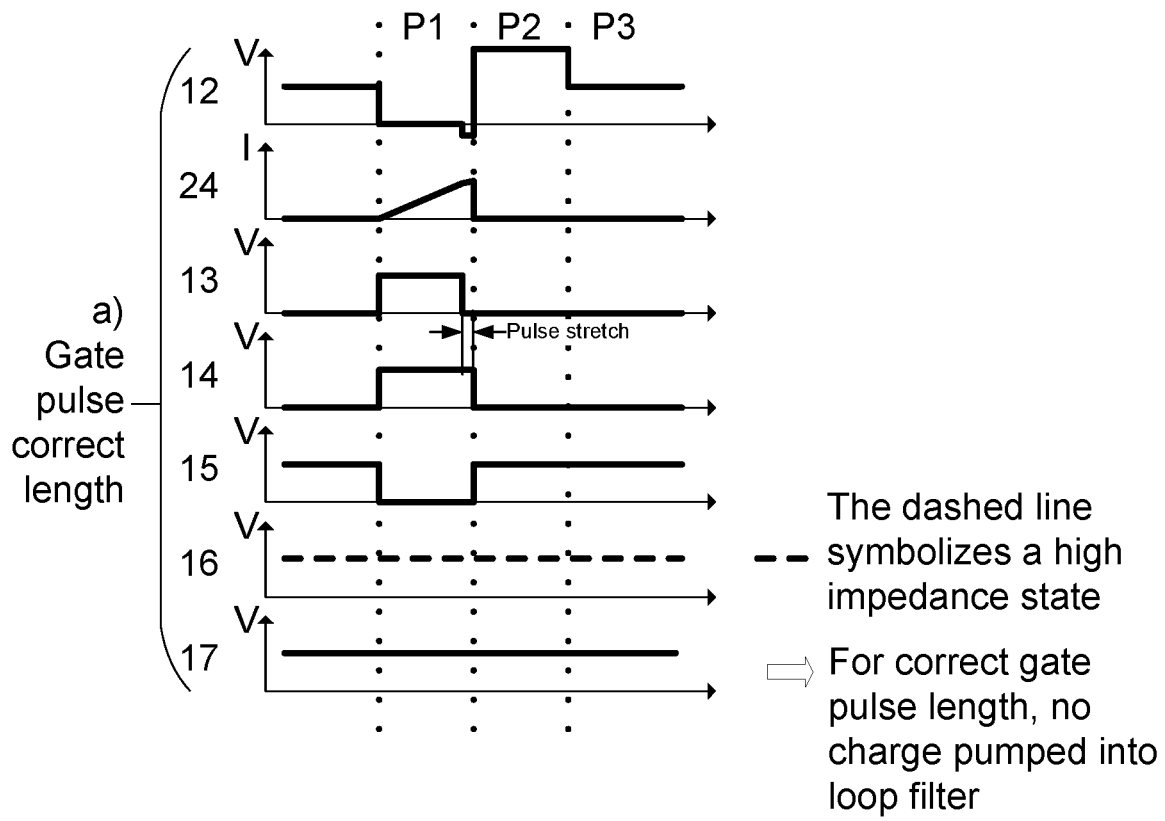
FIG. 4*a-d*: Discloses in an embodiment of the invention the timing between the signals on the DC-DC converter transformer secondary side and the signal in the adaptive control circuitry for the synchronous rectifier, in different states.
Figure 4B:
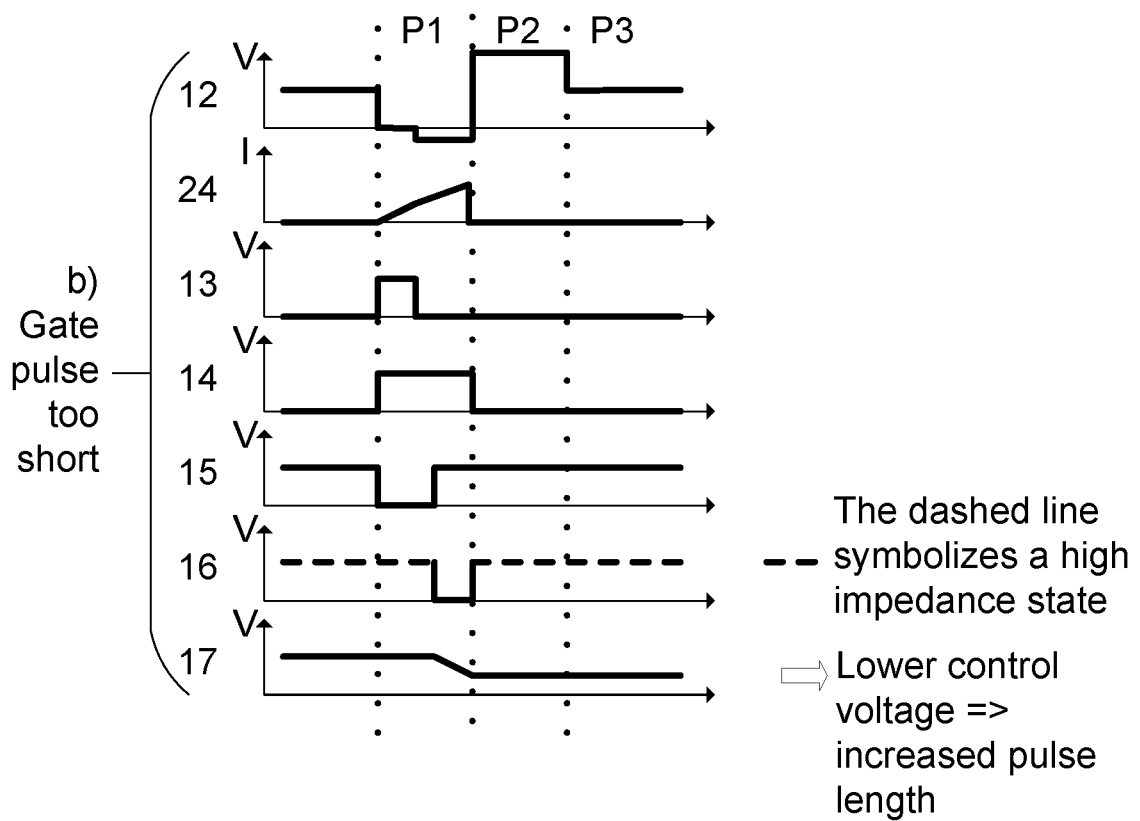
Figure 4C:
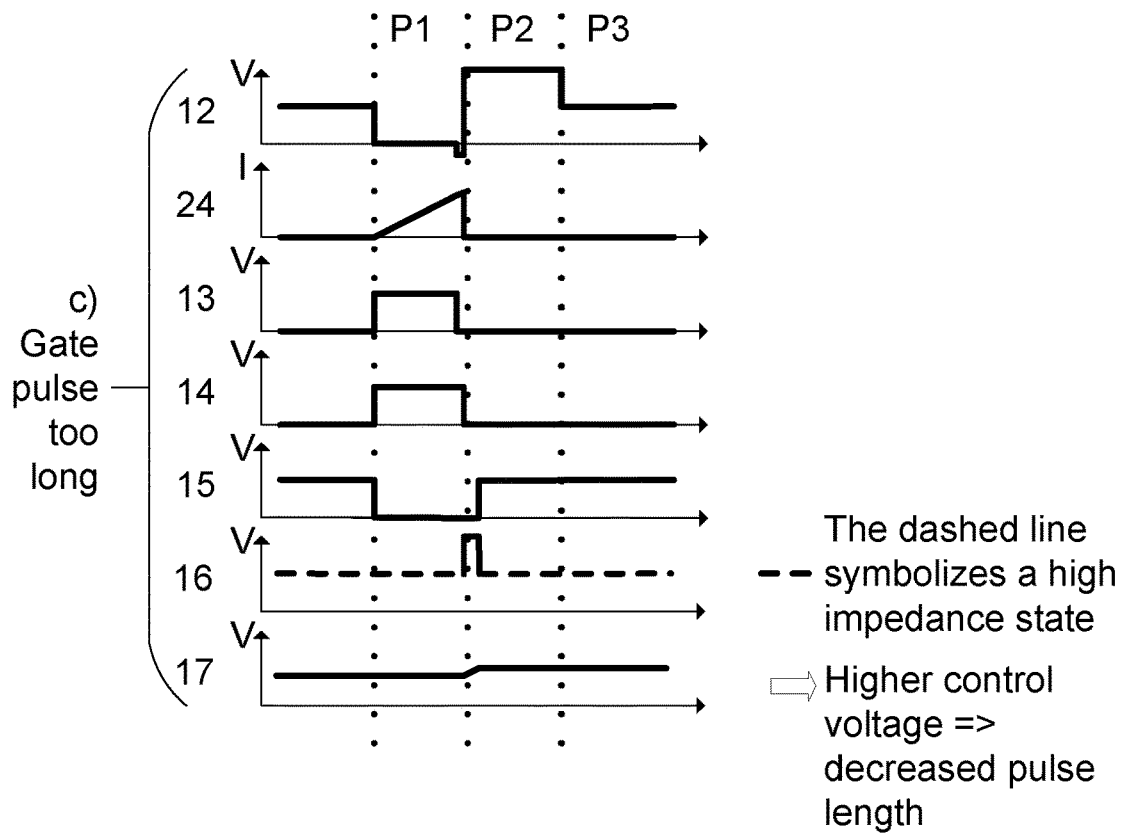
Figure 4D:
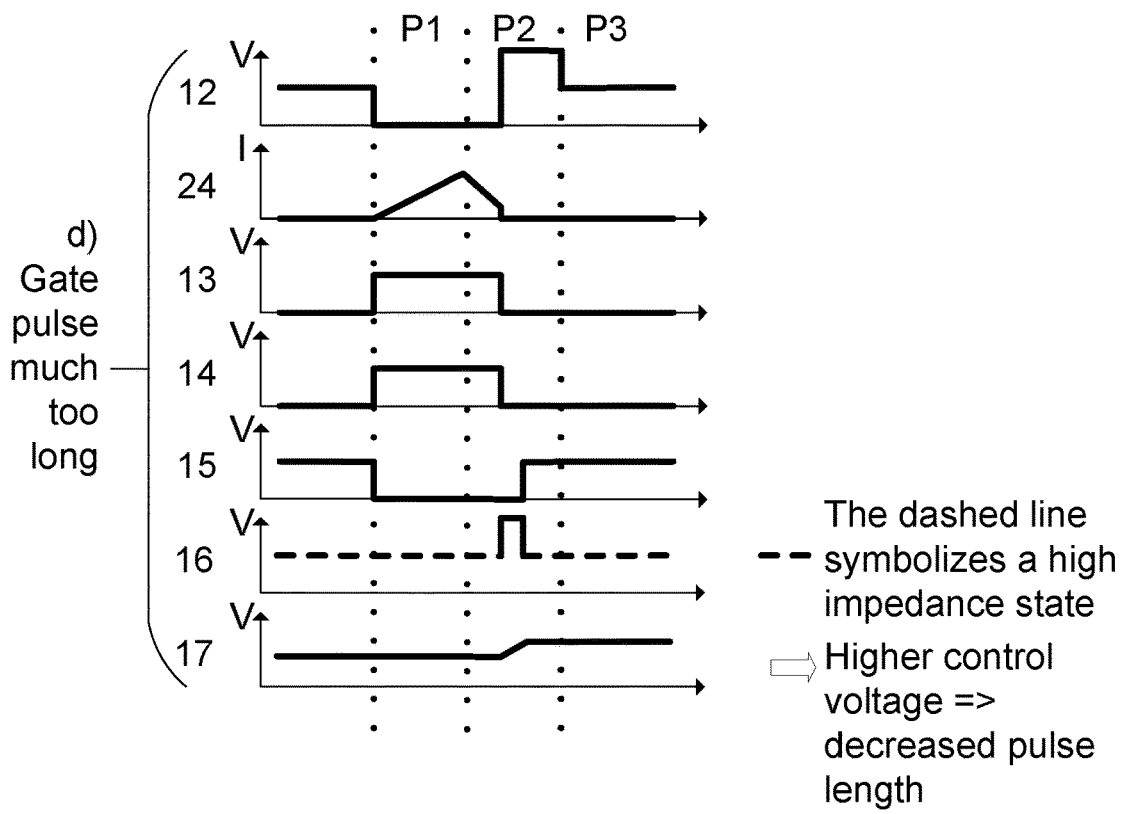

FIGS. 4a-4d illustrates signal timing and pulse lengths in various states of an embodiment of the invention. FIG. 4a illustrates the signals in an embodiment when the gate drive signal (13) substantially reflects the transformer transferred driver signal (12); FIG. 4b illustrates the signals in an embodiment when the pulses of the gate drive signal (13) are too short; and FIGS. 4c and 4d illustrate the signals in an embodiment when the pulses of the gate drive signal (13) are too long and much too long, respectively.

FIG. 4a discloses the timing between the current (24) on the DC-DC converter transformer secondary side (42) and the signals (12-17) within the adaptive control circuitry for the synchronous rectifier (5), when the gate pulse length (13) is correctly regulated to the primary side circuit switching. The beginning of the gate pulse (13) is triggered by the trigger signal (14), inversely representing the transformer transferred driver signal (12), when it enters the first phase of operation (P1). The length of the gate pulse (13) is controlled by the control voltage (17) to the voltage controlled pulse length circuitry (19), and as can be seen in this diagram, the gate pulse is regulated to end shortly before the trigger signal (14) ends.

The pulse stretch is indicated in the figure, as involving stretching and inverting the gate driver pulse (13) to establish an inverted pulse stretched feedback (15). As this diagram shows the a correctly synchronized state, it can be observed that the fixed pulse stretch amount corresponds in length to the difference between the gate drive pulse (13) and the trigger signal pulse (14), thereby causing the inverted pulse stretched feedback (15) to correspond in length substantially to the trigger signal pulse (14). The input signals (14 and 15) for the phase detector (21) are, when correctly synchronized as in this diagram, precisely in opposite phase, causing the charge pump (21) to be continuously high-impedance (16) and thereby causing no charge injection into the loop filter (22) and thereby no adjustment of the pulse length control voltage signal (17).

FIG. 4b discloses the timing between the signals on the DC-DC converter transformer secondary side (42) and the signals (12-17) within the adaptive control circuitry for the synchronous rectifier (5), when the gate pulse (13) is too short, and thereby not synchronized with the transformer transferred driver signal (12).

In a first phase of operation (P1) the transformer transferred driver signal (12) is low, triggering a gate drive pulse (13). The gate pulse depicted in the figure is too short, resulting in a transition from low to high of the inverted pulse stretched feedback signal (15) before the trigger signal (14) returns to a low value. This means that the FET (T1) of the active rectifier (5) turns off too early, resulting in inefficient operation during the last part of the first phase (P1). The phase detector detects that the trigger signal (14) is high while the inverted feedback signal (15) is also high, resulting in a removal of charge from the filter by means of the charge pump output signal (16) being given a low value. The result is a reduction of the control voltage (17) and thereby an increased gate drive pulse length (13) for the next period. When entering the second phase (P2) the trigger signal (14) returns to a low value and the phase detector causes the charge pump output (16) to enter the high impedance state.

FIG. 4c discloses the timing between the signals on the DC-DC converter transformer secondary side (42) and the signals (12-17) in the adaptive control circuitry for the synchronous rectifier (5), when the gate pulse (13) is too long, and thereby not synchronized with the transformer transferred driver signal (12).

In a first phase of operation (P1) the transformer transferred driver signal (12) is low, triggering a gate drive pulse (13). The gate pulse depicted in the figure is too long, resulting in a transition from high to low of the trigger signal (14) before the inverted pulse stretched feedback signal (15) returns to a high value, so that the inverted pulse stretched feedback signal (15) remains high when the circuitry enters the second phase (P2). This means that the gate drive signal (13) is in risk of extending into the second phase (P2) and thereby let the FET (T1) of the active rectifier (5) turn off too late, which would result in inefficient operation during the beginning of the second phase (P2). The phase detector detects that the trigger signal (14) is low while the inverted feedback signal (15) is also low, resulting in an injection of charge into the loop filter (22) by means of the charge pump output signal (16) being given a high value. The result is an increase of the control voltage (17) and thereby a decreased gate drive pulse length (13) for the next period.

FIG. 4d discloses the timing between the signals on the DC-DC converter transformer secondary side (42) and the signals (12-17) in the adaptive control circuitry for the synchronous rectifier (5), when the gate pulse (13) is much too long, and thereby not synchronized with the transformer transferred driver signal (12).

In a first phase of operation (P1) the transformer transferred driver signal (12) is low, triggering a gate drive pulse (13). The gate pulse depicted in the figure is much too long, resulting in continuation of the gate drive pulse (13) significantly into the second phase (P2), causing also the trigger signal (14) to the phase detector (21) to remain high until gate drive signal (13) falls to 0 V. This means that the FET (T1) of the active rectifier (5) turns off too late, well into the second phase (P2), resulting in inefficient operation of the DC-DC converter during the first part of the second phase (P2). Due to the pulse stretch circuitry (20), the inverted pulse stretched feedback signal (15) to the phase detector (21) will be stretched by adding a small additional length to the pulses, causing it to be even longer than the trigger signal (14). The phase detector detects that the trigger signal (14) is low while the inverted feedback signal (15) is also low, resulting in an injection of charge into the filter by means of the charge pump output signal (16) being given a high value. The result is an increase of the control voltage (17) and thereby a decreased gate drive pulse length (13) for the next period.

Figure 5:
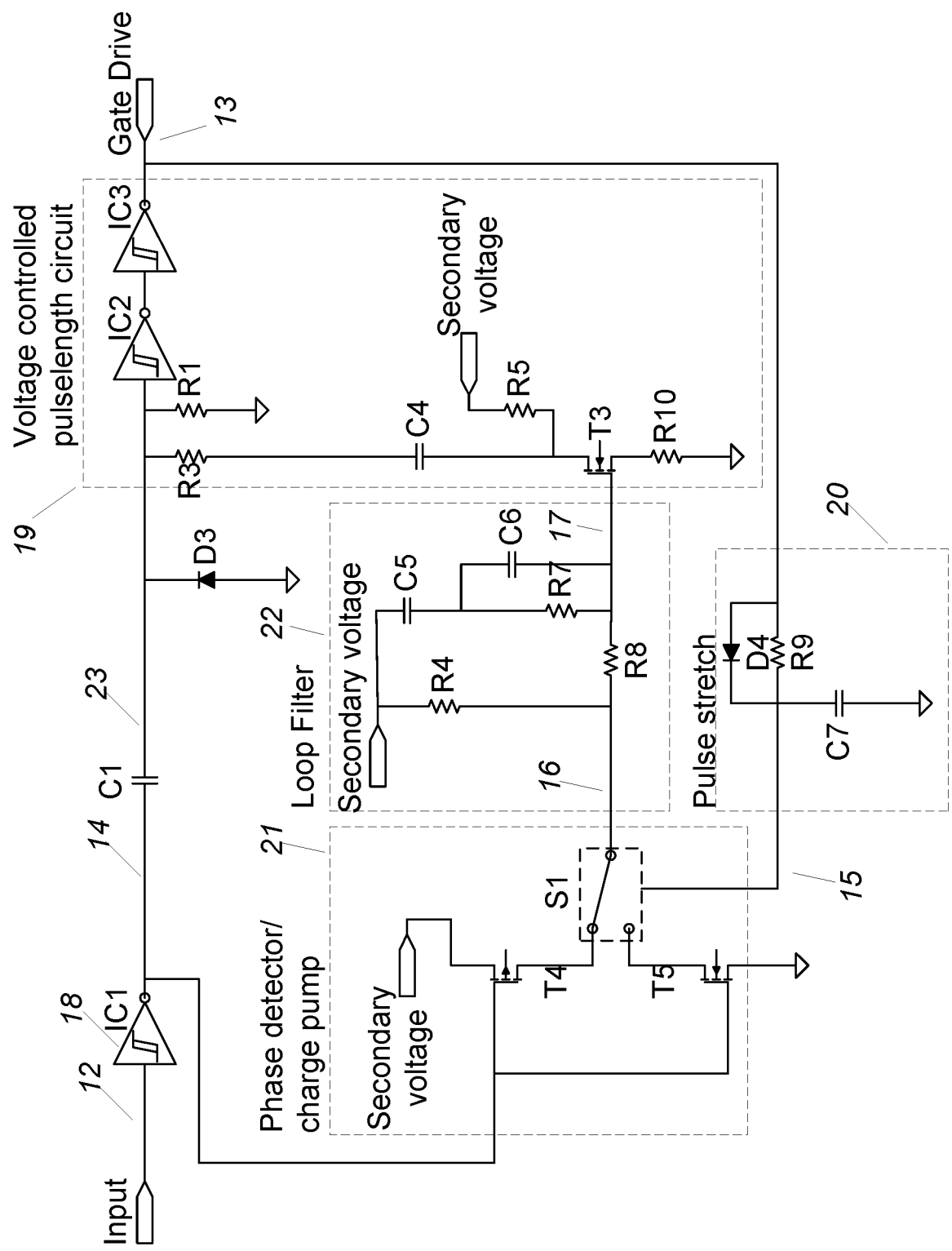
FIG. 5: Discloses one possible embodiment of the adaptive control system implementation.

FIG. 5 discloses one possible embodiment of the adaptive control system implementation.

The transformer transferred driver signal (12) is buffered by a gate (18) and transmitted as a trigger signal (14) to the variable pulse length circuitry (19) and phase detector (21). The low to high transition of the trigger signal (14) is transferred to the Gate IC2 in the variable pulse length circuitry (19) by the AC-coupling capacitor C1, and the transition is transferred through to the gate drive signal (13) by the gates IC2 and IC3. Thereby the turning on of the active rectifier FET (T1) is directly triggered by the transformer transferred driver signal (12) going low.

To control the length of the pulse of the gate drive signal (13), i.e. the on-time of the FET (T1), which as described above preferably should be slightly shorter than the pulse at the trigger signal (14), the signal voltage on the gate input (23) will drop as Capacitor C1 is discharged through the combined resistance of resistors R1, R3, R10 and the on-resistance of the FET transistor (T3). When the voltage level on the gate input (23) reaches the lower threshold voltage of the gate (IC2) the gate drive signal (13) will transition from high to low, thus ending the gate drive pulse (13). This means that the RC time constant formed by C1 and the discharge resistors R1, R3, R10 and the on-resistance of the FET (T3) determines the pulse length. The capacitor C4 is an AC-coupling capacitor allowing R5 to bias the drain of a pulse length controlling FET-transistor (T3) and thereby reducing the effective capacitance seen at the drain. Diode D3 ensures that the voltage at the gate input (23) is not driven significantly below zero when the trigger signal (14) transitions from high to low.

The phase detector/charge pump (21) is in this embodiment comprised of a first transistor (T4), which first transistor is by a source terminal connected to the supply voltage, and a second transistor (T5), which second transistor is by a source terminal connected to the ground reference, and both the first and the second transistors are by a gate terminal connected to the trigger signal (14), and both transistors are by a drain terminal connected to two separate input terminals on a single pole double throw (SPDT) analog switch (S1), which analog switch is connected by a common terminal to the charge pump output (16) and connected by the switch control input to the pulse stretched gate drive signal feedback (15). The transistors may be arranged so that high level on the trigger signal (14) biases the analog switch with supply voltage through the first transistor (T4) and a low level on the trigger signal (14) connects the analog switch to GND through the second transistor (T5).

The inversion of the feedback (15) illustrated in FIG. 3 and timing diagrams FIG. 4a-4d may be achieved by selecting the proper initial position of the analog switch (S1) for its control input being low. The control of the analog switch should be configured in correspondence with the above description in relation to the timing diagrams so that when the trigger signal (14) and the pulse stretched gate drive signal (15) are equal no current flow in any direction trough the analog switch (S1). When the trigger signal (14) is high but the pulse stretched gate drive signal (15) goes low, i.e. the gate pulse is too short, the switch should connect the GND level from the second transistor (T5) to the filter to allow discharging. When the trigger signal (14) goes low while the pulse stretched gate drive signal (15) is still high, i.e. the gate pulse is too long, the switch should connect the bias voltage from the first transistor (T4) to the filter to allow charging.

In an embodiment, the phase detector and charge pump (21) may be configured as it appears in the below Table 1, with the signal reference numbers in the header row:

TABLE 1

| 14 | 15 | 16 | 17 | 13 |
|---|---|---|---|---|
| High | High | Hi-Z | Unchanged | Unchanged |
| High | Low | Low (Discharge) | Lower | Longer |
| Low | High | High (Charge) | Higher | Shorter |
| Low | Low | Hi-Z | Unchanged | Unchanged |

The output of the charge pump (16) is connected to a filter (22) comprised of capacitors C5, C6 and resistors R4, R7. The resistor R8 limits the current and thereby the amount of charge that can be removed or injected in one operation cycle.

FIG. 5 further illustrates an embodiment of a pulse stretch circuitry (20), comprising a diode D4 to allow a high level at the gate driver signal (13) to appear immediately at the pulse stretched signal (15), and a series resistance R9 and shunt capacitor C7 to cause the high level to remain at the pulse stretched signal (15) after the gate drive signal (13) goes low, for as long as it takes the capacitor C7 to discharge below the high level threshold voltage through resistor R9. The fixed amount of added extra length to gate drive pulses is thus primarily determined by the RC time constant defined by resistor R9 and capacitor C7.

Figure 6:
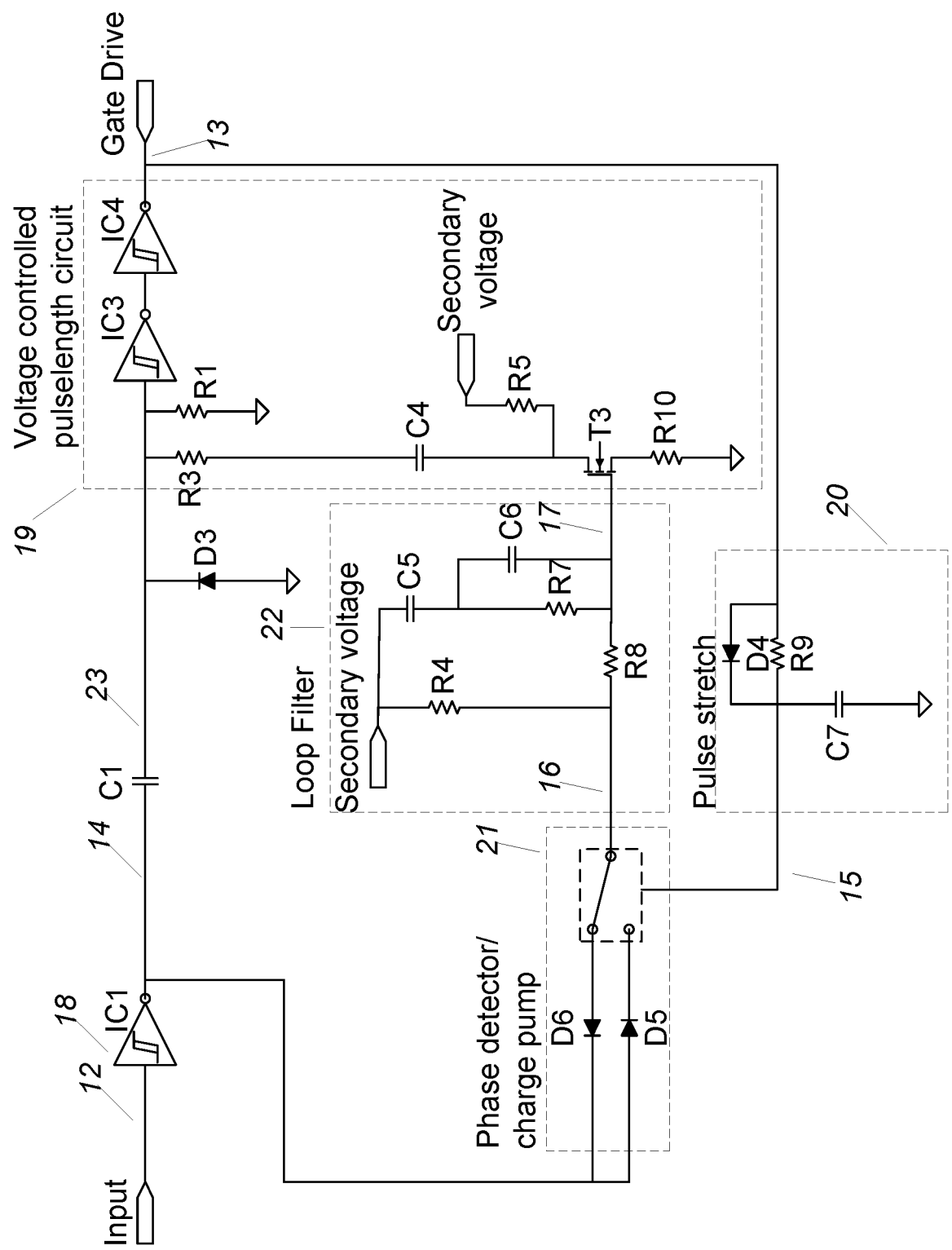
FIG. 6: Discloses an embodiment using diodes for the phase detection circuitry.

As another example embodiment of a phase detector and charge pump (21), FIG. 6 discloses an embodiment, which decrease the number of active components compared to the embodiment of FIG. 5 by exchanging the transistors (T4 and T5) in the phase detector by diodes (D5 and D6). By this implementation it shall be ensured that the gate IC1 can supply the necessary charge current for the charge pump.

With FIG. 5 and FIG. 6, and the above corresponding description, specific embodiments have, for illustrative purposes and simplicity, been illustrated in the same figures for the phase detector, the charge pump, the filter, the voltage controlled pulse length circuit and the pulse stretch circuitry. The skilled person will acknowledge that the specific implementations of one or more of these blocks can be changed within the general disclosure of the invention, and without requiring substantial changes to other blocks. For example, several alternative embodiments of a pulse stretch circuit may be available to the skilled person, with and without inversion functionality, and can be selected according to specific application requirements. Likewise, each of the other blocks may be implemented differently by the skilled person, according to for example application requirements. Further, with the above description of each block and example implementation of FIG. 5, the skilled person will be able to select appropriate component values without undue burden, and in accordance with a specific application requirement.

The invention claimed is:

1. A current loop powered DC-DC converter comprising a transformer having a primary winding and a secondary winding establishing a primary side and a secondary side, the primary winding being connected to a transformer drive circuitry arranged to provide a drive signal onto the primary winding, the secondary winding being connected to at least one rectifier, characterized in that the rectifier is realized as an active rectifier, comprising a FET-transistor and a rectifier drive circuitry arranged to provide a gate drive signal for the FET-transistor, wherein the rectifier drive circuitry comprises a phase detector arranged to detect a phase difference between a representation of a pulse of a transformer transferred driver signal present at the secondary side of the transformer and a representation of a pulse of the gate drive signal for the active rectifier FET transistor, wherein an output signal of the phase detector is connected to a charge balance circuitry arranged to control by a charge balance circuitry output voltage a pulse length of the active rectifier FET transistor gate drive signal, wherein the charge balance circuitry comprises a charge pump and a low pass filter; and wherein the representation of the pulse of the gate drive signal comprises a pulse-stretched representation of the pulse.

2. The current loop powered DC-DC converter according to claim 1, wherein the rectifier drive circuitry comprises a pulse stretch circuitry arranged to establish the representation of the pulse of the gate drive signal and provide it to the phase detector.

3. The current loop powered DC-DC converter according to claim 2, wherein a pulse duration of a pulse of the representation of the pulse of the gate drive signal is longer than a pulse duration of the pulse of the gate drive signal.

4. The current loop powered DC-DC converter according to claim 1, wherein the phase difference detected by the phase detector relates to a difference in pulse length of the representation of the pulse of the transformer transferred driver signal and the representation of the pulse of the gate drive signal.

5. The current loop powered DC-DC converter according to claim 1, wherein the difference detected by the phase detector relates to a difference in transition timing of the representation of the pulse of the transformer transferred driver signal and the representation of the pulse of the gate drive signal.

6. The current loop powered DC-DC converter according to claim 1, wherein the difference detected by the phase detector relates to a timing difference of a trailing edge of the representation of the pulse of the transformer transferred driver signal and the representation of the pulse of the gate drive signal.

7. The current loop powered DC-DC converter according to claim 1, wherein the transformer transferred driver signal is present between the secondary winding and the active rectifier.

8. The current loop powered DC-DC converter according to claim 1, whereby said gate drive signal gets synchronized to said transformer transferred driver signal.

9. The current loop powered DC-DC converter according to claim 1, wherein said DC-DC converter is a switching DC-DC converter having a switching circuitry at the primary side.

10. The current loop powered DC-DC converter according to claim 1, wherein said drive signal provided by said transformer drive circuitry onto the primary winding is a switching voltage.

11. The current loop powered DC-DC converter according to claim 1, whereby rectifying on the secondary side is synchronized with switching on the primary side.

12. The current loop powered DC-DC converter according to claim 1, wherein said secondary side is galvanically isolated from said primary side.

13. The current loop powered DC-DC converter according to claim 1, wherein said rectifier drive circuit is galvanically isolated from said transformer drive circuit.

14. The current loop powered DC-DC converter according to claim 1, wherein a DC secondary voltage of the secondary side of the current loop powered DC-DC converter is less than 6 V.

15. The current loop powered DC-DC converter according to claim 1, wherein the phase detector comprises an analog switch for controlling said output signal of the phase detector, wherein one of the representation of the pulse of the gate drive signal and the representation of the pulse of the transformer transferred driver signal is arranged to control said analog switch, and the other of the representation of the pulse of the gate drive signal and the representation of the pulse of the transformer transferred driver signal is arranged to control a current flowing into said analog switch and on to said charge balance circuitry.

16. The current loop powered DC-DC converter according to claim 1, wherein the phase detector and charge pump circuitry comprises a first transistor having a source terminal connected to a supply voltage, and a second transistor having a source terminal connected to a ground reference, and both the first and the second transistors have a gate terminal connected to the representation of the pulse of a transformer transferred driver signal, and both transistors have a drain terminal connected to two separate input terminals on a switch, wherein a common terminal of the switch is connected to a charge pump output and a switch control input of the switch is connected to the representation of the pulse of the gate drive signal.

17. The current loop powered DC-DC converter according claim 1, wherein the phase detector and charge pump comprises a first diode having an anode terminal connected to the representation of the pulse of a transformer transferred driver signal and a cathode terminal connected to one input terminal on a switch, and a second diode having a cathode terminal connected to the representation of the pulse of a transformer transferred driver signal and an anode terminal connected to another input terminal on the switch, wherein a common terminal of the switch is connected to a charge pump output and a switch control input of the switch is connected to the representation of the pulse of the gate drive signal.

18. A method of controlling a current loop powered DC-DC converter, the DC-DC converter comprising a transformer having a primary winding and a secondary winding forming part of a primary side and a secondary side, respectively, the secondary side comprising an active rectifier comprising a FET-transistor, the method comprising the steps of:

providing by a transformer drive circuitry on the primary side a drive signal onto the primary winding;

generating by a rectifier drive circuitry on the secondary side a gate drive signal to control the FET-transistor; and regulating a pulse length of the active rectifier FET transistor gate drive signal by a charge balance circuitry output voltage on the basis of a phase difference between a representation of a pulse of a transformer transferred driver signal present at the secondary side of the transformer and a representation of a pulse of the gate drive signal for the active rectifier FET transistor;

wherein the charge balance circuitry output voltage is controlled by the charge balance circuitry comprising a charge pump and a low pass filter; and wherein the representation of the pulse of the gate drive signal comprises a pulse-stretched representation of the pulse.

19. The method of claim 18, wherein the current loop powered DC-DC converter is the current loop powered DC-DC converter according to claim 1.

* * * * *